(12) United States Patent
Pellow et al.

(10) Patent No.: US 9,710,839 B2
(45) Date of Patent: Jul. 18, 2017

(54) SYSTEM FOR EMBEDDING MAPS WITHIN RETAIL STORE SEARCH RESULTS AND METHOD OF USING SAME

(71) Applicant: Wal-Mart Stores, Inc., Bentonville, AR (US)

(72) Inventors: Benjamin Pellow, Oakland, CA (US); Emily Poplawski, San Francisco, CA (US); Stephen Aase, Portland, OR (US)

(73) Assignee: WAL-MART STORES, INC., Bentonville, AR (US)

( * ) Notice: Subject to any disclaimer, the term of this patent is extended or adjusted under 35 U.S.C. 154(b) by 0 days.

(21) Appl. No.: 14/610,459

(22) Filed: Jan. 30, 2015

(65) Prior Publication Data

US 2016/0225056 A1    Aug. 4, 2016

(51) Int. Cl.
*G06Q 30/06* (2012.01)

(52) U.S. Cl.
CPC ..... *G06Q 30/0625* (2013.01); *G06Q 30/0639* (2013.01); *G06Q 30/0643* (2013.01)

(58) Field of Classification Search
CPC .......................... G06G 30/06; G06Q 30/0282
USPC ................................. 705/26.1, 26.7
See application file for complete search history.

(56) References Cited

U.S. PATENT DOCUMENTS

| | | | | |
|---|---|---|---|---|
| 2006/0059049 A1* | 3/2006 | Morris | ............... | G06Q 30/0601 705/26.1 |
| 2010/0179885 A1* | 7/2010 | Fiorentino | ............. | G06Q 30/02 705/26.1 |
| 2013/0036043 A1* | 2/2013 | Faith | ..................... | G06Q 30/06 705/39 |
| 2013/0173435 A1* | 7/2013 | Cozad, Jr. | ............ | G06Q 10/087 705/28 |
| 2014/0058886 A1* | 2/2014 | Gopalakrishnan | ..... | G06Q 30/02 705/26.8 |
| 2014/0279294 A1* | 9/2014 | Field-Darragh | ..... | G06Q 10/087 705/28 |
| 2014/0304075 A1* | 10/2014 | Dillingham | ........ | G06Q 30/0261 705/14.58 |
| 2016/0148147 A1* | 5/2016 | Gupta | .................. | G06Q 10/087 705/7.15 |

\* cited by examiner

*Primary Examiner* — Mila Airapetian
(74) *Attorney, Agent, or Firm* — Bryan Cave LLP

(57) ABSTRACT

A system and method includes receiving a search query for a product to be located in a retail store, performing a search on a plurality of products records corresponding to a plurality of products located in the retail store, identifying one or more of the product records relevant to the product in the search query, obtaining a store map, the store map being indicative of a layout of the retail store, transmitting a representation of the store map and the one or more product records identified as one or more search results, and providing the one or more search results as a list to a mobile device, each of the one or more search results being associated with a physical location of the product in the retail store, and present the store map overlaid with an icon on a graphical display of the mobile device, wherein the store map represents the retail store and the icon is positioned overlaid on the map to designate a physical location of a corresponding one or more of the list of search results for the retail store.

19 Claims, 6 Drawing Sheets

SYSTEM FOR EMBEDDING MAPS WITHIN RETAIL STORE SEARCH RESULTS AND METHOD OF USING SAME

BACKGROUND OF THE INVENTION

1. Field of the Invention

The present invention relates generally to retail store search results and, more particularly, to a system for embedding maps within retail store search results and method of using same.

2. Description of the Related Art

It is known that a large retailer typically has a number of retail stores with items or products stocked in the retail stores. Many consumers visit a specific retail store when shopping for products, for example, groceries, office supplies, household wares, etc. Typically, the specific retail store may have thousands of sections and hundreds of aisles for the products. Accordingly, traversing these aisles looking for specific products may be a harrowing experience. In addition, it is known that when customers cannot find the products that they are looking for, the retail store is losing significant revenue because these customers cannot find the products that they want to buy.

A customer may use a mobile device running a mobile application of the retailer to identify an item or product within the retail store. With so many brands of a product and different products offered for sale within a retail store, it can be difficult for a customer to find a specific product within the retail store. Currently, some retailers offer store maps of a single product, for example pickles. For example, the retail store may offer a store map of a single product on a product page. However, these retailers do not provide maps for search results of products within the retail store or categories (collections) of products contextually embedded in the list page of the search results for products within the retail store.

It is, therefore, desirable to provide a new system and method which embeds maps within retail store search results for a retail store. It is also desirable to provide a new system and method that offers product maps for each product within a retail store. It is further desirable to provide a new system and method that provide maps for search results or categories (collections) of products within the retail store contextually embedded in a list page of the search results for the retail store. Thus, there is a need in the art to provide a system for embedding maps within retail store search results and method of using same that meets at least one of these desires.

SUMMARY OF THE INVENTION

Accordingly, the present invention provides a system including a computer system configured to provide output of a retail store to a mobile device of a customer. The computer system is configured to receive a search query for a product to be located in the retail store inputted by the customer into a mobile application running on the mobile device, to perform a search on a plurality of products records corresponding to a plurality of products located in the retail store, to identify one or more of the product records relevant to the product in the search query, to obtain a store map, the store map being indicative of a layout of the retail store, and to transmit a representation of the store map and the one or more product records identified as one or more search results. The computer system is also configured to provide the one or more search results as a list to the mobile device, each of the one or more search results being associated with a physical location of the product in the retail store, and to present the store map overlaid with an icon on a graphical display of the mobile device, wherein the store map represents the retail store and the icon is positioned overlaid on the map to designate a physical location of a corresponding one or more of the list of search results for the retail store.

In addition, the present invention provides a method including the steps of receiving, by a computer system, a search query for a product to be located in a retail store inputted into a mobile application running on a mobile device by a customer using the mobile device. The method also includes the steps of performing a search, by the computer system, on a plurality of products records corresponding to a plurality of products located in the retail store. The method includes the steps of identifying, by the computer system, one or more of the product records relevant to the product in the search query, and obtaining, by the computer system, a store map, the store map being indicative of a layout of the retail store. The method further includes the steps of transmitting, by the computer system, a representation of the store map and the one or more product records identified as one or more search results, and providing, by the computer system, the one or more search results as a list to the mobile device, each of the one or more search results being associated with a physical location of the product in the retail store, and present the store map overlaid with an icon on a graphical display of the mobile device, wherein the store map represents the retail store and the icon is positioned overlaid on the map to designate a physical location of a corresponding one or more of the list of search results for the retail store.

Further, the present invention provides one or more non-transitory computer-readable storage media, having computer-executable instructions embodied thereon, wherein when executed by at least one processor. The computer-executable instructions cause the processor to receive a search query for a product to be located in a retail store inputted into a mobile application running on a mobile device by a customer using the mobile device and to perform a search on a plurality of products records corresponding to a plurality of products located in the retail store. The computer-executable instructions also cause the processor to identify one or more of the product records relevant to the product in the search query, to obtain a store map, the store map being indicative of a layout of the retail store, and to transmit a representation of the store map and the one or more product records identified as one or more search results. The computer-executable instructions further cause the processor to provide the one or more search results as a list to the mobile device, each of the one or more search results being associated with a physical location of the product in the retail store, and present the store map overlaid with an icon on a graphical display of the mobile device, wherein the store map represents the retail store and the icon is positioned overlaid on the map to designate a physical location of a corresponding one or more of the list of search results for the retail store.

One advantage of the present invention is that a new system and method is provided for embedding maps within retail store search results for a retail store of a large retailer. Another advantage of the present invention is that the system and method provides maps for search results of products within the retail store or categories (collections) of products within the retail store contextually embedded in a list page of the search results for the retail store. Yet another advantage of the present invention is that the system and method maps in-store search results for a retail store within the context of the search results for products within the retail store. Still another advantage of the present invention is that the system and method produces multiple maps for a product, i.e. a map for each brand or specific product of a product, offered for sale within a retail store in search results for the product so that a customer can find the brand of specific product within the retail store. A further advantage of the present invention is that the system and method allows clustering to lead the customer to the correct department or section when search results are across the retail store. Yet a further advantage of the present invention is that the system and method provides informative maps without clicking and loading item pages.

Other features and advantages of the present invention will be readily appreciated, as the same becomes better understood, after reading the subsequent description taken in conjunction with the accompanying drawings.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

Figure 1:
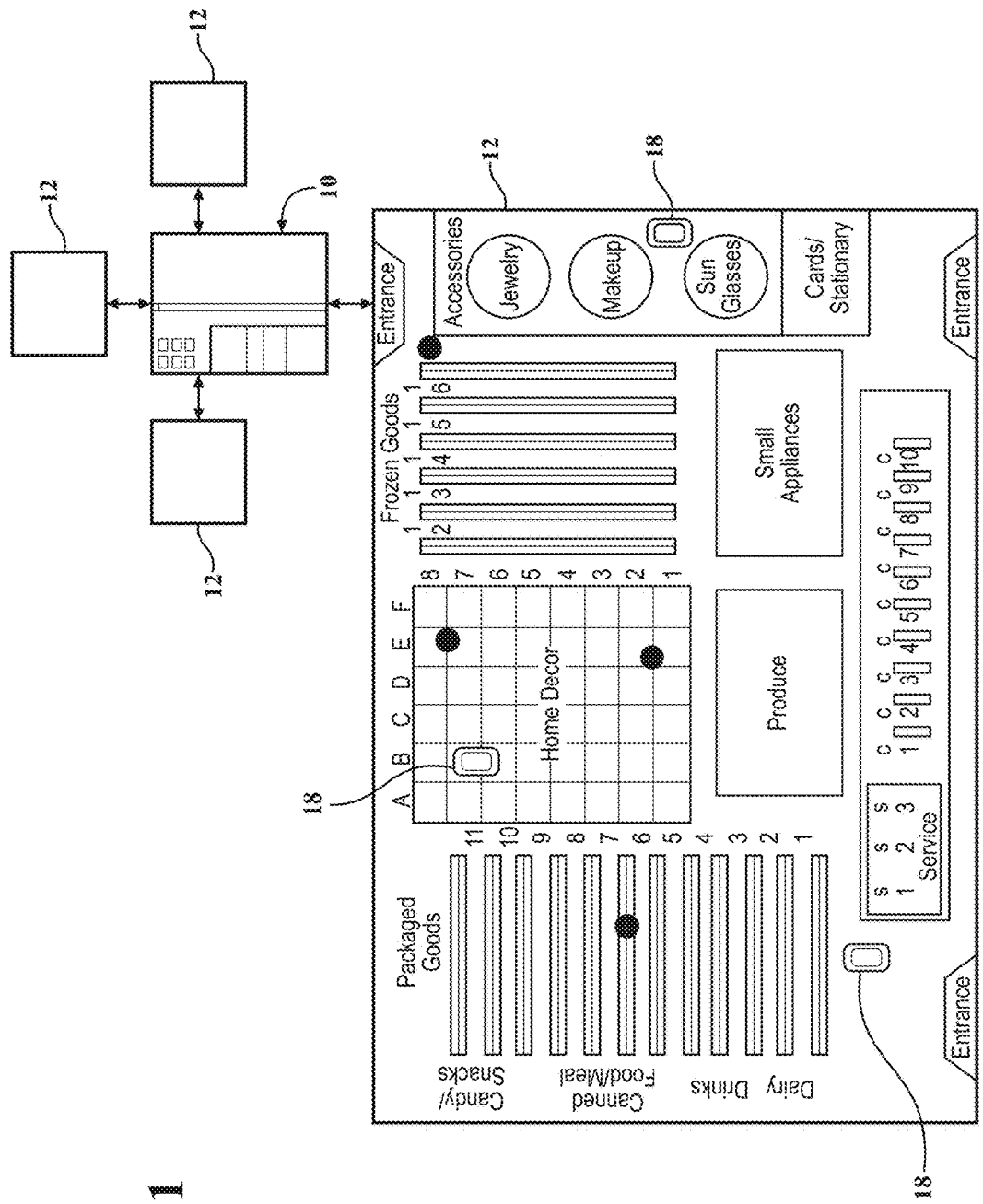
FIG. 1 is a diagrammatic view of a system for embedding maps within retail store search results, according to one embodiment of the present invention, illustrated in relationship with a retail store and at least one mobile device of a customer.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION OF THE PREFERRED EMBODIMENT(S)

In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or sub-combinations in one or more embodiments or examples. In addition, it is appreciated that the figures provided herewith are for explanation purposes to persons ordinarily skilled in the art and that the drawings are not necessarily drawn to scale.

Embodiments in accordance with the present invention may be embodied as an apparatus, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "module" or "system." Furthermore, the present invention may take the form of a computer program product embodied in any tangible media of expression having computer-usable program code embodied in the media.

Any combination of one or more computer-usable or computer-readable media (or medium) may be utilized. For example, a computer-readable media may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present invention may be written in any combination of one or more programming languages.

Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

The flowchart and block diagrams in the flow diagrams illustrate the architecture, functionality, and operation of possible implementations of systems, methods, and computer program products according to various embodiments of the present invention. In this regard, each block in the flowchart or block diagrams may represent a module, segment, or portion of code, which includes one or more executable instructions for implementing the specified logical function(s). It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions. These computer program instructions may also be stored in a computer-readable media that can direct a computer or other programmable data processing apparatus to function in a particular manner, such that the instructions stored in the computer-readable media produce an article of manufacture including instruction means which implement the function/act specified in the flowchart and/or block diagram block or blocks.

Several (or different) elements discussed below, and/or claimed, are described as being "coupled", "in communication with", or "configured to be in communication with". This terminology is intended to be non-limiting, and where appropriate, be interpreted to include without limitation, wired and wireless communication using any one or a plurality of a suitable protocols, as well as communication methods that are constantly maintained, are made on a periodic basis, and/or made or initiated on an as needed basis.

The disclosure particularly describes how a large retailer may embed maps within retail store search results for a retail store of the retailer. Particularly, the present disclosure describes how a system associated with a large retailer provides maps for search results or categories (collections) of products contextually embedded in a list page of the search results for a retail store.

With reference to the FIGS. and in operation, the present invention provides a system 10, methods and computer product media that facilitate the embedding of maps within retail store search results for a retail store. In particular, the present invention produces a map with multiple products, i.e. a map so that each brand of a product or a specific product, offered for sale within a retail store, in a single map for the search results so that a customer can find or locate a specific brand or product within the retail store. It should be appreciated that one map is embedded in the search results so that all brands are seen on single map according to the search results.

Referring to FIG. 1, an exemplary environment in which the system 10 for embedding maps within search results of a retail store 12, according to the present invention, operates is illustrated. The system 10 may be configured for a large retailer having one or more retail stores 12 each having one or more items or products in the retail stores 12. The term "retail store" can include brick-and-mortar stores operated by a single retailer, e.g., supermarket or superstore, or a location that includes stores operated by multiple retailers, e.g., a shopping mall or a shopping plaza.

The exemplary retail store 12 illustrated in FIG. 1 can be arranged into different departments, such as packaged goods including dairy, drinks, canned foods/meals, and candy/snacksproduce; home decor; produce; frozen goods; small appliances; and accessories including jewelry, make-up, sunglasses, and cards/stationary. Each department can be further delineated. For example, the exemplary packaged goods area of the retail store 12 can be subdivided into aisles 1-11 and each aisle can define an "a" side and a "b" side opposite the "a" side. The exemplary home decor area can be divided into a grid by letters A-F along a first edge and numbers 1-8 along a second edge perpendicular to the first edge. The illustrated, exemplary retail store 12 can also include one or more entrances, a service counter, and several checkout lines each referenced in FIG. 1 by the letter "c" and a number. It should be appreciated that the arrangement of the retail store 12 is exemplary. It should also be appreciated that, in some embodiments of the present invention, the retail store 12 can be arranged differently and include different departments and/or different products and/or methods for labeling aisles.

Figure 2:
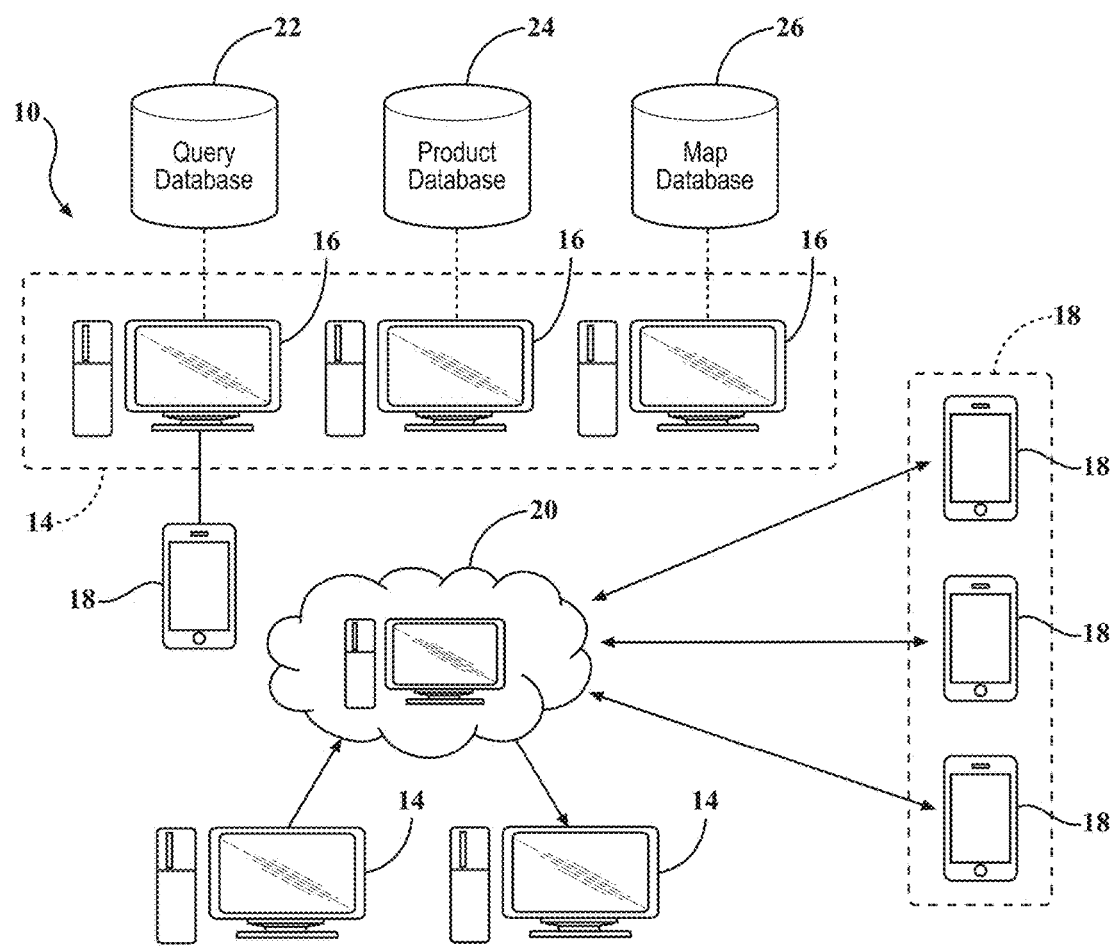
FIG. 2 is another diagrammatic view of the system of FIG. 1.

Referring to FIG. 2, the system 10 may include one or more server systems 14 that may each be embodied as one or more server computers 16 each including one or more processors that are in data communication with one another. The server system 14 may be in data communication with one or more customer devices. In the system 10 and method disclosed herein, the customer devices may be embodied as mobile devices 18 such as desktop computers or other computing device such as a mobile phone or tablet computer.

For clarity in discussing the various functions of the system 10, multiple computers and/or servers are discussed as performing different functions. These different computers (or servers) may, however, be implemented in multiple different ways such as modules within a single computer, as nodes of a computer system, etc. . . . The functions as performed by the system 10 (or nodes or modules) may be centralized or distributed in any suitable manner across the system 10 and its components, regardless of the location of specific hardware. Furthermore, specific components of the system 10 may be referenced using functional terminology in their names. The function terminology is used solely for purposes of naming convention and to distinguish one element from another in the following discussion. Unless otherwise specified, the name of an element conveys no specific functionality to the element or component.

Some or all of the server systems 14, servers, or server computers 16 and customer devices or mobile devices 18 may communicate with one another by means of a network 20. The network 20 may be embodied as a peer-to-peer connection between devices, a connection through a local area network (LAN), WiFi network, the Internet, or any other communication medium or system. Each of the server systems 14 or server computers 16 may be coupled to one another by separate networks or some or all of the server systems 14 or server computers 16 may share a common network. For example, in some embodiments, the server systems 14 or server computers 16 may communicate over a separate private network, rather than over the network 20.

Figure 3:
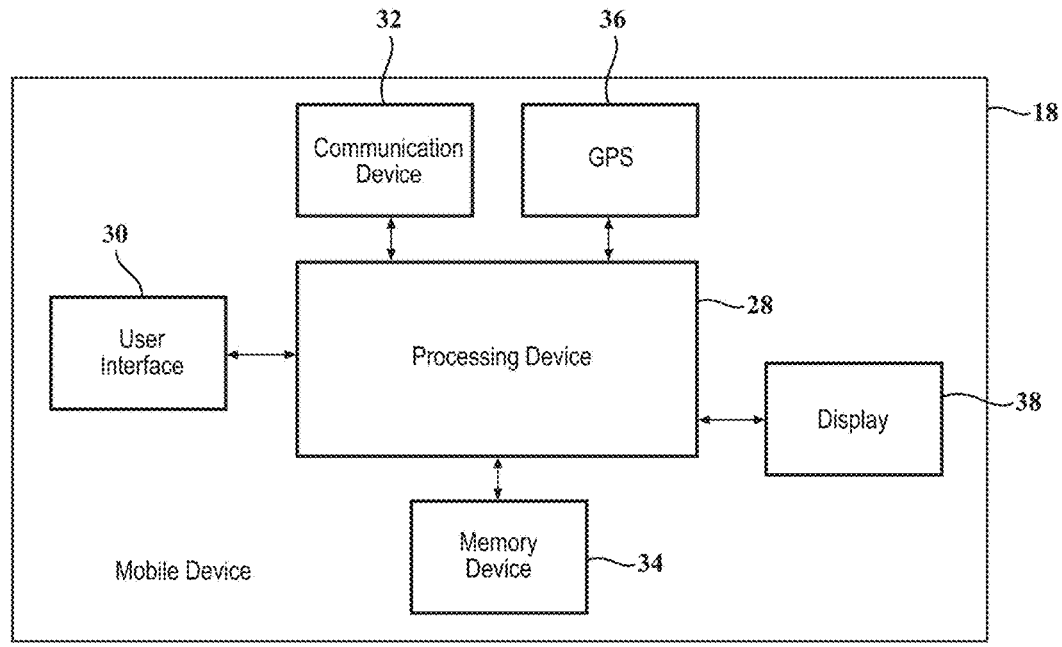
FIG. 3 is a diagrammatic view of a mobile device used with the system of FIG. 1.

Referring now to FIG. 3, a schematic illustrating example components of one mobile device 18 of FIG. 1 is illustrated. In the illustrative embodiment, the mobile device 18 includes a processing device 28, a user interface 30, a communication device 32, a memory device 34, a global positioning system (GPS) 36, and a display 38. It should be appreciated that the mobile device 18 can include other components and some of the components are not required.

The processing device 28 can include memory, e.g., read only memory (ROM) and random access memory (RAM), storing processor-executable instructions and one or more processors that execute the processor-executable instructions. In embodiments where the processing device 28 includes two or more processors, the processors can operate in a parallel or distributed manner. The processing device 28 can execute the operating system of the mobile device 18.

The user interface 30 is a device that allows a user to interact with the mobile device 18. While one user interface 30 is shown, the term "user interface" can include, but is not limited to, a touch screen, a physical keyboard, a mouse, a microphone, and/or a speaker. The communication device 32 is a device that allows the mobile device 18 to communicate with another device, e.g., the server system 14 or server computer 16, via the network 20. The communication device 32 can include one or more wireless transceivers for performing wireless communication and/or one or more communication ports for performing wired communication. The memory device 34 is a device that stores data generated or received by the mobile device 18. The memory device 34 can include, but is not limited to, a hard disc drive, an optical disc drive, and/or a flash memory drive.

The GPS 36 is a device that determines a location of the mobile device 18 by communicating with a plurality of GPS satellites. The GPS 36 can perform known triangulation techniques to determine the GPS coordinates of the mobile device 18. It should be appreciated that while a GPS 36 is shown, any other suitable component for determining the location of the mobile device 18 can be implemented.

The display 38 of the mobile device 10 may be a graphical user interface (GUI) that displays retail store search results and a store map to be described. The GUI further includes a plurality of input objects which allow the user to provide commands to the mobile device 18. In some embodiments, the system 10 returns a product waypoint corresponding to an item or product in the retail search results, each product waypoint indicating a physical location of a specific product in the retail store 12. The display 38 on the mobile device 18 can display the product waypoints to the user via the GUI. In some embodiments, the product waypoints can be displayed in the electronic search results list and/or in a store map of the retail store 12 at which the customer intends to purchase the products. In some embodiments, the server system 14 can return a map of the store and waypoints corresponding to the items or products in the search results and map to the mobile device 18 of the customer. The mobile device 18 can display the store map to the customer, such that the waypoints are displayed in the map. It should be appreciated that, in some embodiments, the user interface 30 and the display 38 may be one in the same.

Referring again to FIG. 2, the server system 14 may be associated with a retailer, or other entity, providing search services. For example, the server system 14 may host a search engine or a site hosted by a retailer to provide access to information about products and user opinions about products. For example, the server system 14 may host or access a query database 22, product database 24, map database 26, which may be coupled to the server system 14 or server computers 16.

The system 10 described herein may make use of data known about queries and user responses to queries. Accordingly, the server system 14 may host or access the query database 22 of queries. A record for a query may include product click data for a particular query. Product click data may additionally or alternatively include impression data. For example, a record of a query may include a record of the product records returned as a result for the query and an indication of which of the product records were actually selected by the query's author. In some embodiments, for each brand record of a plurality of brands, impressions for the brand (e.g. a number of times product records corresponding to the brand have been included in search results to a query) and click data for the brand (e.g. a number of times product records corresponding to the brand were selected from among search results) may be compiled for the queries and associated with the product record.

The system 10 described herein may make use of product data for products located in the retail store 12. Accordingly, the server system 14 may host or access the product database 24 of products located in the retail store 12. The product database 24 may store a plurality of product records. The product records may have one or more brands associated therewith. A brand for a product may represent the manufacturer, seller, importer, or the like for a product and/or a manufacturer of a component part of a product, or other reference to an entity participating in the production and offer for sale of a product.

The system 10 described herein may make use of map data for a map of the retail store 12. Accordingly, the server system 14 may host or access the map database 26 for a map of the retail store 12. The map database 26 may store a plurality of maps for a plurality of retail stores 12. It should be appreciated that each map is produced from a CAD drawing of each retail store 12.

Figure 4:
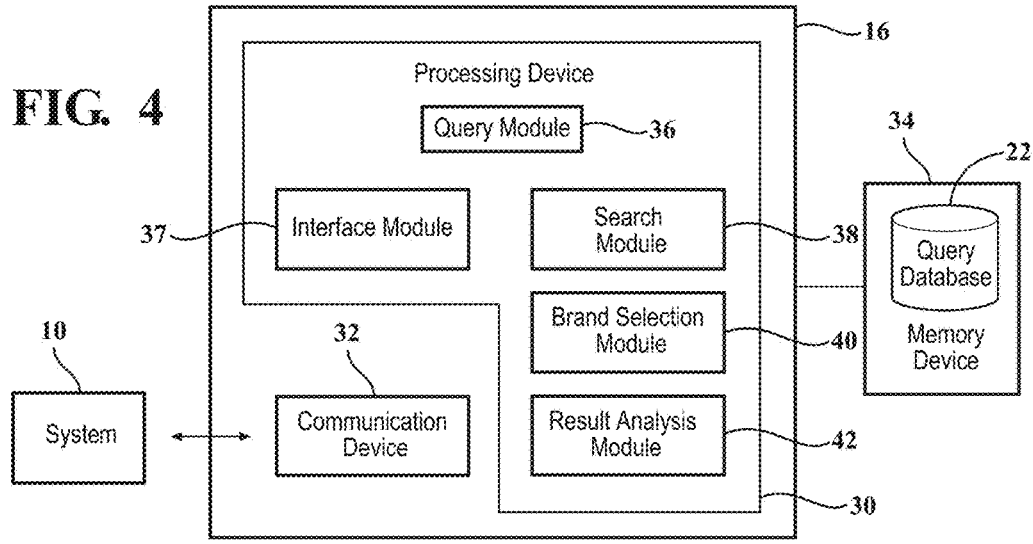
FIG. 4 is a diagrammatic view of one portion of the system of FIG. 1.

Referring to FIG. 4, the server computer 16 for querying the query database 22 may be configured to perform one or more functions at the request of the mobile device 18. In the illustrated embodiment, the query server computer 16 may include a processing device 30, a communication device 32, and memory device 34.

The processing device 30 can include memory, e.g., read only memory (ROM) and random access memory (RAM), storing processor-executable instructions and one or more processors that execute the processor-executable instructions. In embodiments where the processing device 30 includes two or more processors, the processors can operate in a parallel or distributed manner. In the illustrative embodiment, the processing device 30 executes one or more of a query module 36, an interface module 37, a search module 38, a brand determination module 40, and a result analysis module 42.

The communication device 32 is a device that allows the query server computer 16 to communicate with another device, e.g., the mobile device 18, via the network 20. The communication device 32 can include one or more wireless transceivers for performing wireless communication and/or one or more communication ports for performing wired communication. The communication device 32 is accessible to the processing device 30.

The memory device 34 is a device that stores data generated or received by the query server computer 16. The memory device 34 can include, but is not limited to a hard disc drive, an optical disc drive, and/or a flash memory drive. Further, the memory device 34 may be distributed and located at multiple locations. The memory device 34 is accessible to the processing device 30. In some embodiments, the memory device 34 stores the query database 22.

The query module 36 includes software and/or hardware modules implementing searching methods disclosed herein. In some embodiments, the modules and data of the query module 36 are implemented or accessed by the server system 14, query server computer 16, or some other entity that provides an interface to the query module 36.

The query module 36 may include the interface module 37 for receiving queries and transmitting responses to queries to a requesting entity. The interface module 37 may be part of a data flow such that a query input to the query module 36 is not received directly from, for example, the mobile device 18. For example, a query may be expanded or otherwise modified to include keywords associated with concepts identified in the query. The query may also be generated by some other software module executed by the server system 14. Whichever entity originated a query received by the interface module 37, the interface module 37 may route the search results to this requesting entity or to some other entity specified with the query.

The query module 36 may include the search module 38 that may search a corpus of documents, such as a database of product records, over the Internet, or other corpus and return results relevant to a particular query. The search module 38 may implement any search algorithm, e.g. search engine, known in the art for identifying documents relevant to a query, from a simple keyword matching search to a more complex search with word sense disambiguation, contextual searching, or other strategy for identifying relevant documents.

The query module 36 may also include the brand selection module 40 that may select brands for use in one or both of filtering search results, organizing search results, and presenting search results to users. The brand selection module 40 may select brands corresponding to the product queried that are physically located in the retail store 12 using outputs from the result analysis module 42.

Figure 5:
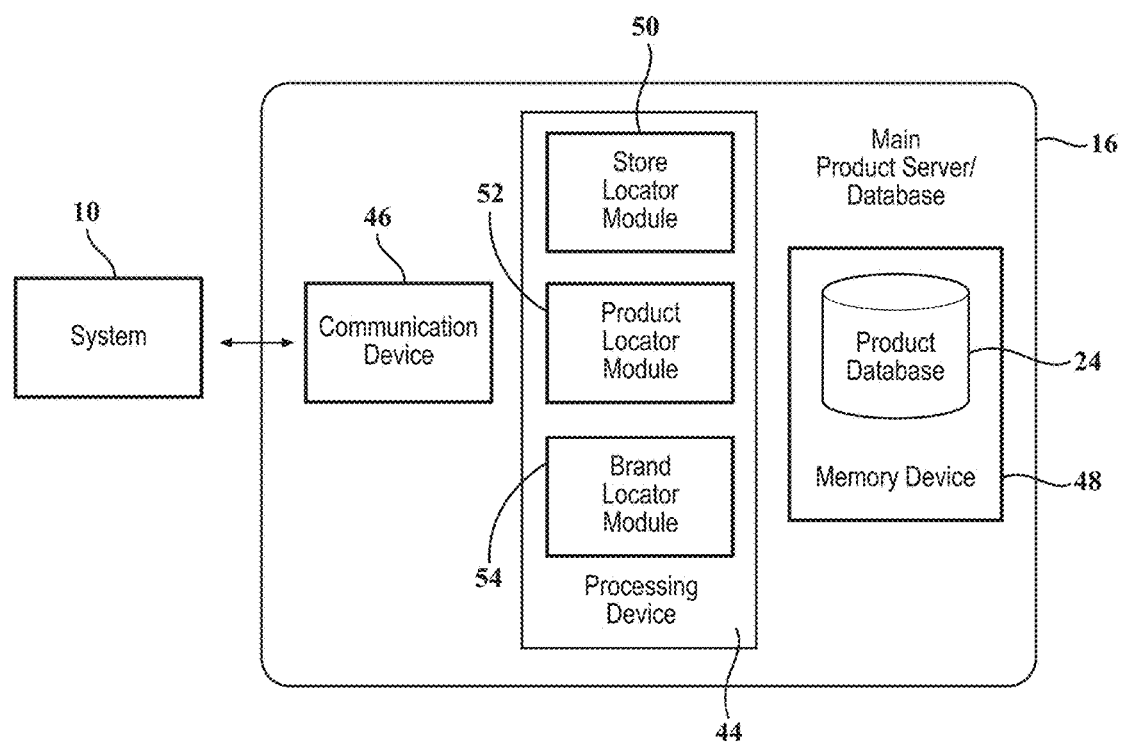
FIG. 5 is a diagrammatic view of another portion of the system of FIG. 1.

The query module 36 may also include the result analysis module 42. The brands that are useful in identifying relevant search results may be determined in part based on a composition of search results, specifically the number of product records corresponding to each brand present in the search results. Accordingly, the result analysis module 42 may evaluate search results in order to facilitate this determination. It should be appreciated that a different search database and/or store search algorithm could be used than that described Referring to FIG. 5, the main product server computer 16 for accessing the main product database 24 may be configured to perform one or more functions at the request of the mobile device 18. The product server 16 may be configured to perform one or more of the requested functions. In the illustrated embodiment, the product server 16 may include a processing device 44, a communication device 46, and memory device 48. It should be appreciated that the main product database 24 communicates with individual store product databases and is updated from them. It should also be appreciated that the main product database 24 can be updated by either polling the store product databases as a set frequency or by allowing the store product databases to push updates directly to the main product database 24. It should further be appreciated that one system or database links products to aisles and the other system or database links aisles to locations, which are both combined to get locations for products in the aisles. It should still further be appreciated that, in other embodiments, the system 10 could query the actual store product database itself instead of the main product database 24.

The processing device 44 can include memory, e.g., read only memory (ROM) and random access memory (RAM), storing processor-executable instructions and one or more processors that execute the processor-executable instructions. In embodiments where the processing device 44 includes two or more processors, the processors can operate in a parallel or distributed manner. In the illustrative embodiment, the processing device 44 executes one or more of a store locator module 50, a product locator module 52, and a brand locator module 54.

The communication device 46 is a device that allows the product server 16 to communicate with another device, e.g., query server computer 16, map server computer 16, and/or the mobile device 18, via the network 20. The communication device 46 can include one or more wireless transceivers for performing wireless communication and/or one or more communication ports for performing wired communication. The communication device 46 is accessible to the processing device 44.

The memory device 48 is a device that stores data generated or received by the product server computer 16. The memory device 48 can include, but is not limited to a hard disc drive, an optical disc drive, and/or a flash memory drive. Further, the memory device 48 may be distributed and located at multiple locations. The memory device 48 is accessible to the processing device 44. In some embodiments, the memory device 44 stores the product database 24.

In some embodiments, the memory device 48 stores a retail store location database that can store the retail store locations of one or more retail stores 12 operated or associated with a retailer. The retail store location database may be queried using a specific location, e.g., GPS coordinates, or a general location, e.g., postal zip code or city/state, and can return one or more retail stores 12 that are proximate to the specific or general location.

In some embodiments, the product database 24 stores product waypoints indicating physical locations of the products sold by the retailer in a particular or specific retail store 12 operated or associated with the retailer. For example, the product database 24 may store the location of "milk" in the retail store 12 operated or associated with the retailer. The product database 24 may be queried with the item "milk" and a specific location of the retail store 12, and may return a waypoint indicating the physical location of "milk" at a specific location in the retail store 12.

The product database 24 may be configured to store waypoints for specific products and generic products. For example, the product database 24 may be configured to store waypoints indicating the location of "ice cream," a generic product, and the location of "Brand X ice cream," a specific product. It should be noted that a waypoint corresponding to a generic product or specific product may be represented using a starting location and ending location. For example, a waypoint corresponding to "ice cream" may indicate where the ice cream section begins and where the "ice cream" section ends. Similarly, a waypoint corresponding to "Brand X ice cream" may indicate where the Brand X's ice cream begins and ends. It should be appreciated that when a specific product is a species of a generic product, e.g., Brand X ice cream is a species of "ice cream," the waypoint corresponding to a specific product may be wholly contained within the waypoint corresponding to the generic product. In some embodiments, a generic product may be located in more than one location in the retail store 12. For example, milk may be located in the dairy section, while organic milk may be located in the natural foods location. In this type of scenario, the product database 24 may store more than one location for milk in the retail store 12. When such a situation arises, the product locator module 52 may retrieve multiple product waypoints, such that the multiple waypoints corresponding to the generic product are provided to the mobile device 18.

The product database 24 may further store a type of each product sold by the retailer, e.g., groceries, home decor, and personal goods, and/or a section of the product, e.g., dairy or men's clothing. Furthermore, the types and/or sections can be stored relative to each store location. In this way, the product database 24 can be queried with a store location of the retail store 12 and a product and can return a type or brand of the product and/or a section of the product at the store location of the retail store 12.

As discussed, the processing device 44 may execute the store locator module 50. The store locator module 50 receives a location from the mobile device 18 and determines one or more store locations of the retail stores 12 corresponding to the received location. In some embodiments, the store locator module 50 queries the store location database with the received location and receives the store location of the retail store 12 that correspond to the received location. When more than one store location is received, the store locator module 50 may automatically select the store location nearest to the received location or may provide the store locations to the mobile device 18, thereby allowing the mobile device 18 or the user or customer to select the store location of the retail store 12. It should be appreciated that the user or customer can choose their store location/address as well in case that they want to search a retail store different from the location the mobile device 18 is providing or if the mobile device 18 is not returning a store location.

The product locator module 52 receives an input of a product to be located in the retail store 12 and determines product waypoints corresponding to one or more items or products. In some embodiments, the product locator module 52 for the product queries the product database 24 with the product and a store location (which may have been determined by the store locator module 50) and receives a product waypoint indicating a location of the product indicated in the retail store 12 corresponding to the store location.

Once the product locator module 52 has determined the various waypoints, e.g., product waypoints, the product locator module 52 may provide the product waypoints to the mobile device 18, such that the mobile device 18 can display the product waypoints in the electronic list of retail store search results for the retail store 12. It should be appreciated that the mobile device 18 can display the product waypoint in an electronic store map for the retail store 12.

Figure 6:
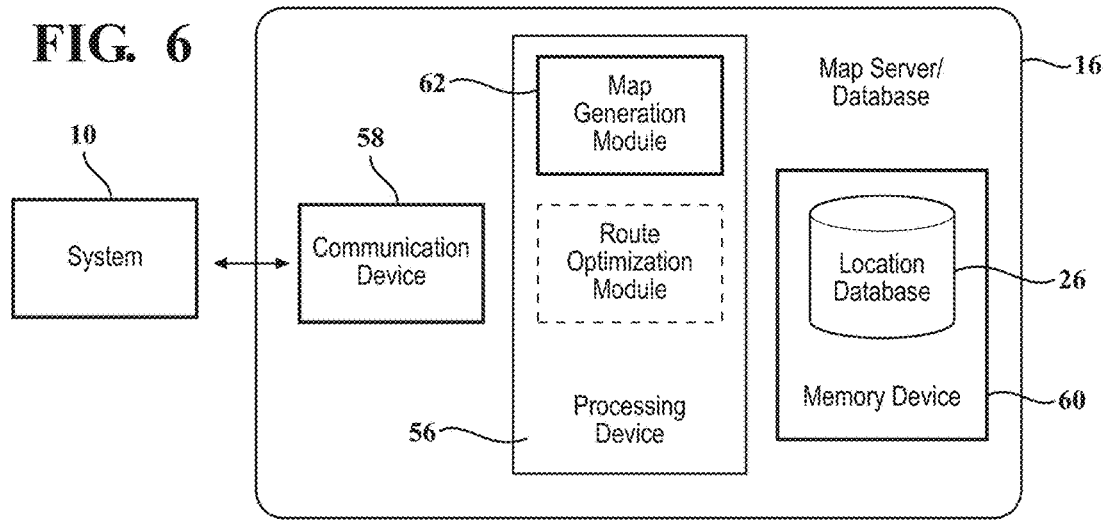
FIG. 6 is a diagrammatic view of yet another portion of the system of FIG. 1.

Referring now to FIG. 6, an example of the map server computer 16 accessing the map database 26 is illustrated. In the illustrated example, the map server 16 includes, but is not limited to, a processing device 56, a communication device 58, and a memory device 60.

The processing device 56 can include memory, e.g., read only memory (ROM) and random access memory (RAM), storing processor-executable instructions and one or more processors that execute the processor-executable instructions. In embodiments where the processing device 56 includes two or more processors, the processors can operate in a parallel or distributed manner. In the illustrative embodiment, the processing device 56 executes one or more of a map generation module 62, a product location module 64, and a route determination module (not shown).

The communication device 58 is a device that allows the map server computer 16 to communicate with another device, e.g., the server system 14, the server computers 16, and/or the mobile devices 18, via the communication network 20. The communication device 58 can include one or more wireless transceivers for performing wireless communication and/or one or more communication ports for performing wired communication. The communication device 58 is accessible to the processing device 56.

The memory device 60 can be any device that stores data generated or received by the map server computer 16. The memory device 60 can include, but is not limited to a hard disc drive, an optical disc drive, and/or a flash memory drive. Further, the memory device 60 may be distributed and located at multiple locations. The memory device 60 is accessible to the processing device 56. In some embodiments, the memory device 60 stores the map database 26.

The map database 26 stores maps corresponding to different retail locations of the retail stores 12. Each map can be divided into a plurality of regions. A region can describe any type of boundary in the retail location. For instance, in the supermarket setting, a region can refer to a section, e.g., deli or frozen foods, one or more aisles, e.g., aisle, a checkout station, and/or a bank of checkout stations. In some embodiments, the regions may be defined by a collection of geospatial coordinates, e.g., GPS coordinates. Additionally, each map may have metadata associated therewith. Furthermore, for each retail location, the location database 26 may store product locations for the products sold at the retail location. Each product has an aisle location which has a GPS coordinates or a relative location, e.g., "Brand X Cereal" is located at aisle nine, 50 feet from the front of the aisle. The map is a CAD drawing that is processed into a scalable vector graphic (SVG). It should be appreciated that, when the aisle location of a product is changed to a new aisle, the location inherently changes as well because the aisles are fixed to locations. It should also be appreciated that, as used herein, the term "map" may refer to a digital representation of the layout of the corresponding store location of the retail store 12.

The map generation module 62 can generate maps for each map stored in the location database 26 or can generate a map upon receiving a request for a map for a particular location of the retail store 12 from a requesting device, e.g., a mobile device 18, or a requesting process, e.g., a location or route optimization process. For purposes of explanation, the description of the map generation module 62 assumes that the maps are generated in response to a request for a map for a particular location of the retail store 12. It should be appreciated that the techniques described herein can be modified to generate maps for all of the retail locations in the locations database 26 at defined intervals, e.g., every 15 minutes.

The map generation module 62 can receive a request to generate a map for a particular retail location. In response to the request, the map generation module 62 retrieves a map corresponding to the particular retail location from the location database 26. Furthermore, the map generation module 62 can receive product searches for each region of the retail location from the system 10. For example, the map generation module 62 can receive inputs indicating (L, R, P) from the system 10, where L is the retail store location, R is a region of the retail location, and P is a product in the region R. The map generation module 62 receives these inputs for each of the regions in the particular retail location. It should be appreciated that the map generation module 62 only knows the aisle locations for the products and nothing about products themselves. It should also be appreciated that a different store search module provides products with aisle locations, and the map with aisles and the products with aisles are combined to obtain a single map with the products.

In some embodiments, the map generation module 62 may be further configured to obtain a map corresponding to the location of the retail store 12. The map generation module 62 can obtain the map from the location database 26. In some of these embodiments, the map generation module 62 can provide the map and the product waypoints to the mobile device 18. In other embodiments, the map generation module 62 can render the map with one or more waypoints displayed therein. In these embodiments, the map generation module 62 may use the locations indicated by the various waypoints to determine locations in the map where the graphical icons should be displayed. The map generation module 62 can then insert the graphical icons at the determined locations. The map generation module 62 can provide the rendered image to the mobile device 18.

The system 10 links the server systems 14 or server computers 16 to transmit and provide the one or more search results as a list to the mobile device 18. Each of the one or more search results is a name of a brand or specific product and is associated with a physical location of the product in the retail store 12. The store map is overlaid with an icon or waypoint on the display 38 of the mobile device 12. The store map represents the retail store 12 and the waypoint for one of the search results is positioned overlaid on the map to designate a physical location of the corresponding search result in the list of search results for the retail store 12. It should be appreciated that the map is embedded in the search results such that a waypoint for each search result will appear on the map when selected.

Figure 7:
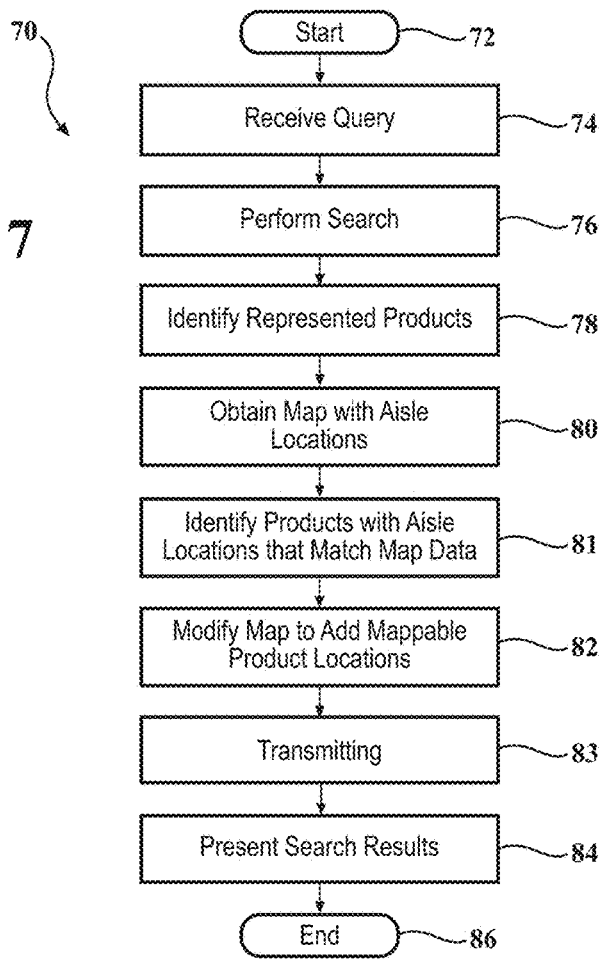
FIG. 7 is a flowchart of a method, according to one embodiment of the present invention, of using the system of FIGS. 1 through 6.

Referring now to FIG. 7, an example method 70, according to one embodiment of the present invention, using the system 10 for the retail store 12 with the mobile device 18 is shown for embedding maps in retail store search results is illustrated. The method 70 can be executed by the components illustrated in FIGS. 1 through 6. In general, a flowchart of the method 70, according to one embodiment of the present invention, starts in bubble 72. The method 70 includes the steps of receiving a query for a product to be located in the retail store 12 from a customer in block 74. For example, receiving, by the system 10, a search query for a product to be located in the retail store 12 inputted into a mobile application running on the mobile device 18 by a customer using the mobile device 18. The method 70 also includes the step of performing a search to identify brands or specific products in the retail store 12 corresponding to the product queried in block 76. For example, performing a search, by the system 10, on a plurality of products records corresponding to a plurality of products located in the retail store 12, which may include inputting the search query to any search algorithm known in the art. The corpus of documents searched may include a database of product records or some other corpus of documents, accessible over the Internet. The method 70 includes the steps of identifying brands or specific products in the retail store 12 corresponding to the product queried. For example, identifying, by the system 10, one or more of the product records relevant to the product in the search query in block 78. For example, each brand has at least one product record corresponding to the brand, or an above-threshold number of product records corresponding thereto, may be deemed to be represented. The method 70 includes the steps of obtaining a map with locations for products in the retail store 12 in block 80. For example, obtaining, by the system 10, a store map of the retail store 12, the store map being indicative of a layout of the retail store 12 and the identified products. The method 70 includes the steps of identifying products with aisle locations that match map data in block 81. For example, identifying, by the system 10, the products with aisle locations that match map data for the store map. The method 70 also includes the steps of modifying the map to add mappable product locations in block 82. For example, modifying, by the system 10, the map to add aisle locations for the products. The method 70 includes the steps of transmitting the identified products in the search results and map in block 83. For example, transmitting, by the system 10, a representation of the store map and the one or more product records identified as one or more search results. The method 70 further includes providing the store map and one or more search results to the mobile device 18 responsive to the search query, the search results each being associated with a location of the product in the retail store 12 and presenting the store map and a list of the retail store search results on the display 38 of the mobile device 18 in block 84. For example, providing, by the system 10, the one or more search results as a list to the mobile device 18, each of the one or more search results being associated with a physical location of the product in the retail store 12 and presenting the store map overlaid with one or more waypoints on the display 38 of the mobile device 18, wherein the store map represents the retail store 12 and the one or more waypoints are positioned overlaid on the map to designate a physical location of a corresponding one or more of the list of search results for the retail store 12. The method ends in block 86. It should be appreciated that the method includes other steps such as providing the computer system and servers and coupling the servers to one another. It should also be appreciated that the flow can differ depending on implementation but that the result is embedded maps in the search results.

Figure 8:
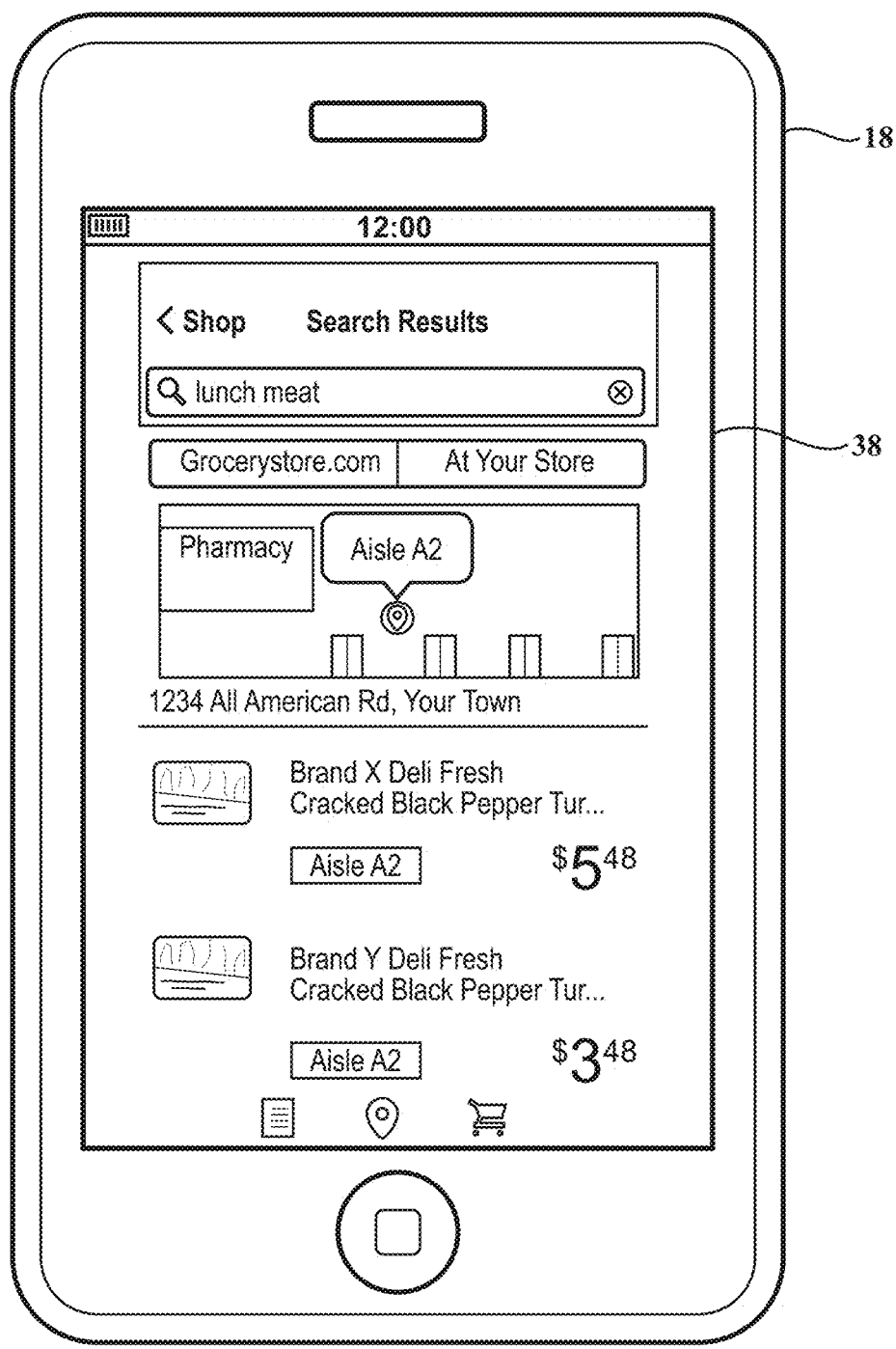
FIG. 8 is an illustration of an exemplary screenshot of the mobile device of FIG. 3 used with the system of FIG. 1.

Referring to FIG. 8, the mobile device 18 can display a list of the search results and a map on the display 38 of the mobile device 18 to the customer. On the display 38, the map for the retail store 12 is displayed at the top of the display 38 and the search results for the product listed below the store map. Each of the search results in the list includes a waypoint, which appears on the map on the display 38 for the retail store 12. For example, a customer may have queried or searched for a product such as "lunch meat". Each of the search results in the list displayed below the map has a waypoint located on the map. In this example, the first search result is for Brand X lunch meat with a waypoint, which appears in the map as aisle location A2. The second search result is for Brand Y lunch meat with a waypoint, which appears in the map as aisle location A2. As can be appreciated, the product waypoints can identify a specific aisle if the product indicated by the item is in an aisle. Otherwise, a description of the section of the product, e.g., "Produce" or "Sunglasses," can be used to show the location of the product. It should be appreciated that, for a specific product, each of the search results may have the same waypoint or different waypoints depending on where the products are located in the retail store 12. It should also be appreciated that one or more pin or waypoint locations are displayed on the embedded map. It should further be appreciated that the example of FIG. 8 is provided for example only and not intended to be limiting.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A system comprising:
   a computer system configured to provide output of a retail store over a network to a mobile device of a customer;
   the computer system being configured to receive over the network a search query for a product to be located in the retail store inputted by the customer into a mobile application running on the mobile device, to perform a search on one or more databases including a plurality of product records corresponding to a plurality of products located in the retail store, to identify a plurality of the plurality of product records relevant to the product in the search query, to obtain a store map, the store map being indicative of a layout of the retail store, and to transmit over the network a representation of the store map and the plurality of the plurality of product records identified as a plurality of search results;

the computer system including a map server configured to generate the representation of the store map; and the computer system being configured to provide the representation of the store map and the plurality of search results as a list of search results over the network to the mobile device with the store map at a top of the list of search results for the product, each of the plurality of the plurality of search results including an icon being associated with a physical location of the product in the retail store, and to display the store map overlaid with the icon on a graphical display of the mobile device, wherein the store map represents the retail store and the icon is positioned overlaid on the store map to designate a physical location of each of the list of search results for the retail store.

2. A system, as set forth in claim 1, wherein said computer system includes a server having a module acquiring an aisle in-store location for the product, mapping the aisle in-store location to the store map, and providing the aisle in-store location for display to the customer on the mobile device.

3. A system, as set forth in claim 1, including a product location database that stores a plurality of icons as a plurality of product waypoints corresponding to one or more aisle locations in the retail store, including the plurality of product waypoints, each product waypoint of the plurality of product waypoints indicating an aisle location of the plurality of aisle locations for a specific product in the retail store, wherein the plurality of product waypoints are obtained from the product location database.

4. A system, as set forth in claim 3, wherein the computer system is further configured to render an image of the store map having the product waypoint displayed therein, wherein the image is provided to the mobile device for display.

5. A system, as set forth in claim 1, including coupling the list of search results to the store map.

6. A system, as set forth in claim 1, wherein the product is searched within the retail store using the mobile application on the mobile device.

7. A system, as set forth in claim 1, wherein products in the retail store are a list provided as search results based on the search query.

8. A system, as set forth in claim 1, wherein a name of the product is provided as part of the search query.

9. A system, as set forth in claim 1, wherein a location of the retail store is provided as part of the search query.

10. A method comprising steps of:

receiving, by a computer system over a network, a search query for a product to be located in a retail store inputted into a mobile application running on a mobile device by a customer using the mobile device;

performing a search, by the computer system, on one or more databases including a plurality of products records corresponding to a plurality of products located in the retail store;

identifying, by the computer system, the plurality of the plurality of product records relevant to the product in the search query, to obtain a store map;

obtaining, by the computer system, the store map, the store map being indicative of a layout of the retail store;

transmitting, by the computer system over the network, a representation of the store map and the plurality of plurality of product records identified as a plurality of search results;

providing, by the computer system, the representation of the store map and the plurality of search results as a list of search results over the network to the mobile device with the store map at a top of the list of search results for the product, each of the plurality of search results including an icon being associated with a physical location of the product in the retail store and displaying the store map overlaid with the icon on a graphical display of the mobile device, wherein the store map represents the retail store and the icon is positioned overlaid on the store map to designate a physical location of each of the list of search results for the retail store.

11. A method, as set forth in claim 10, including a step of providing a database containing information on products within the retail store.

12. A method, as set forth in claim 10, including steps of acquiring an in-store location for the product and providing the in-store location for the product being configured for display to the customer on the mobile device.

13. A method, as set forth in claim 10, including a step of rendering an image of the store map having each icon as a product waypoint displayed therein, wherein the image is provided to the mobile device for display.

14. A method, as set forth in claim 10, including a step of coupling the plurality of search results to the store map.

15. A method, as set forth in claim 10, including a step of searching for products within the retail store using the mobile application on the mobile device.

16. A method, as set forth in claim 10, including a step of listing products in the retail store as search results based on the search query.

17. A method, as set forth in claim 10, wherein a name of the product is provided as part of the search query.

18. A method, as set forth in claim 10, wherein a location of the retail store is provided as part of the search query.

19. One or more non-transitory computer-readable storage media, having computer-executable instructions embodied thereon, wherein when executed by at least one processor, the computer-executable instructions cause the processor to:

receive over a network a search query for a product to be located in a retail store inputted into a mobile application running on a mobile device by a customer using the mobile device;

perform a search on one or more databases including a plurality of products records corresponding to a plurality of products located in the retail store;

identify a plurality of the plurality of product records relevant to the product in the search query;

obtain a store map, the store map being indicative of a layout of the retail store;

transmit over the network a representation of the store map and the plurality of the plurality of product records identified as a plurality of search results; and provide the representation of the store map and the plurality of search results over the network as a list of search results to the mobile device with the store map at a top of the list of search results for the product, each of the plurality of search results including an icon being associated with a physical location of the product in the retail store, and display the store map overlaid with the icon on a graphical display of the mobile device, wherein the store map represents the retail store and the icon is positioned overlaid on the store map to designate a physical location of each of the list of search results for the retail store.

* * * * *